(12) United States Patent
Castrejon, III et al.

(10) Patent No.: US 12,010,003 B1
(45) Date of Patent: Jun. 11, 2024

(54) SYSTEMS AND METHODS FOR DEPLOYING AUTOMATED DIAGNOSTIC ENGINES FOR IDENTIFICATION OF NETWORK CONTROLS STATUS

(71) Applicant: BANK OF AMERICA CORPORATION, Charlotte, NC (US)

(72) Inventors: Tomas M. Castrejon, III, Fort Mill, SC (US); Christopher Stephen Littrell, Dallas, TX (US); Trina Perraut, Fairview, TX (US); Kara M. Schlageter, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/101,991

(22) Filed: Jan. 26, 2023

(51) Int. Cl.
*H04L 43/04* (2022.01)
*G06F 8/60* (2018.01)
*H04L 41/0894* (2022.01)

(52) U.S. Cl.
CPC ............ *H04L 43/04* (2013.01); *G06F 8/60* (2013.01); *H04L 41/0894* (2022.05)

(58) Field of Classification Search
CPC ........ H04L 43/04; H04L 41/0894; G06F 8/60
USPC ...................................................... 709/224
See application file for complete search history.

(56) References Cited

U.S. PATENT DOCUMENTS

| 8,369,830 | B2 | 2/2013 | Sperti et al. |
| 8,769,412 | B2 | 7/2014 | Gill et al. |
| 8,887,286 | B2 | 11/2014 | Dupont et al. |
| 9,015,847 | B1 | 4/2015 | Kaplan et al. |
| 9,652,618 | B1 | 5/2017 | Lerner |
| 9,876,822 | B2 | 1/2018 | Nagaratnam et al. |
| 10,019,677 | B2 | 7/2018 | Gill et al. |
| 10,027,711 | B2 | 7/2018 | Gill et al. |
| 10,129,287 | B2 | 11/2018 | Zaw |
| 10,360,997 | B2 | 7/2019 | Connely, IV et al. |
| 10,601,790 | B2 | 3/2020 | Leon |
| 10,789,316 | B2 | 9/2020 | Noble et al. |
| 10,915,636 | B1 | 2/2021 | Kaplan et al. |
| 10,958,600 | B1 * | 3/2021 | Annadata ............... H04L 51/04 |
| 11,265,347 | B2 | 3/2022 | Hastings |
| 11,297,109 | B2 | 4/2022 | Crabtree et al. |
| 11,418,536 | B2 | 8/2022 | Murphy et al. |
| 11,418,538 | B2 | 8/2022 | Hutchinson et al. |

(Continued)

*Primary Examiner* — Lan Dai T Truong
(74) *Attorney, Agent, or Firm* — Moore & Van Allen PLLC; Nicholas C. Russell

(57) ABSTRACT

Systems, computer program products, and methods are described herein for identifying network control gaps in an automated fashion. The present disclosure is configured to execute instructions to deploy one or more autonomous programs on a network infrastructure; continually monitor feedback data received from the one or more autonomous programs; based on the feedback data received from the one or more autonomous programs, determine that the one or more autonomous programs has circumvented one or more network control policies; analyze the feedback data to determine how the one or more autonomous programs has circumvented the one or more network control policies; and execute instructions to pause access to one or more systems or elevate one or more security requirements in response to determining that the one or more autonomous programs has circumvented one or more network control policies.

17 Claims, 4 Drawing Sheets

(56) References Cited

U.S. PATENT DOCUMENTS

| | | |
|---|---|---|
| 11,483,494 B1 * | 10/2022 | Levy ................... H04N 23/63 |
| 11,575,693 B1 | 2/2023 | Muddu et al. |
| 2016/0342796 A1 | 11/2016 | Kaplan et al. |
| 2018/0284735 A1 | 10/2018 | Cella et al. |
| 2019/0004961 A1 * | 1/2019 | Boggs ................... G06F 12/14 |
| 2020/0244455 A1 * | 7/2020 | Teitzel ................. G06N 20/00 |
| 2020/0294033 A1 * | 9/2020 | Wilson ............... G06Q 20/0658 |
| 2020/0329068 A1 | 10/2020 | Findlay |
| 2021/0192412 A1 | 6/2021 | Krishnaswamy |
| 2021/0288995 A1 | 9/2021 | Attar et al. |
| 2022/0030009 A1 | 1/2022 | Hasan |
| 2022/0044243 A1 * | 2/2022 | Rendahl ................ G06Q 10/10 |
| 2023/0059025 A1 | 2/2023 | Ben David et al. |

\* cited by examiner

SYSTEMS AND METHODS FOR DEPLOYING AUTOMATED DIAGNOSTIC ENGINES FOR IDENTIFICATION OF NETWORK CONTROLS STATUS

TECHNOLOGICAL FIELD

Example embodiments of the present disclosure relate to systems and methods for identifying network control gaps in an automated fashion.

BACKGROUND

Applicant has identified a number of deficiencies and problems associated with efficiently identifying network control gaps in an expeditious manner in order to increase security of customer facing platforms. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for deploying automated diagnostic engines for identification of network controls status. A manager of an electronic network may wish to determine whether their controls (e.g., controls used for authenticating access credentials, controls to determine whether privileges should be elevated, and/or the like) are acting properly or which controls contain gaps. The invention provides a system that trains and implements a network of bots to test and determine whether electronic controls are in place and working according to their intended design. For instance, the network of bots may be trained based on different testing scenarios (e.g., a specific team may train their own network of bots to test whether a user is attempting to improperly elevate their privileges, to test other controls, to test controls across different platforms, and/or the like) and may generate telemetry data showing which controls are working properly and which controls are not. In some embodiments, the bots may further be trained to give a diagnosis of where the controls are failing, why the controls are failing, and what should be implemented to improve or fix the controls.

In some embodiments, the network of bots may comprise a network of chat bots which are used in combination with a middleware component (e.g., a component between third party sources in which data is collected, or the like) to further enrich the data used to train the chat bots so the chat bots are aware how to run the tests to copy a misappropriation attempt. Based on the whether the chat bots are able to get through the controls using the enriched tests, the system may determine how to enhance the controls to prevent future attacks.

In some embodiments, the present invention is configured to execute instructions to deploy one or more autonomous programs on a network infrastructure; continually monitor feedback data received from the one or more autonomous programs; based on the feedback data received from the one or more autonomous programs, determine that the one or more autonomous programs has circumvented one or more network control policies; analyze the feedback data to determine how the one or more autonomous programs has circumvented the one or more network control policies; and execute instructions to pause access to one or more systems or elevate one or more security requirements in response to determining that the one or more autonomous programs has circumvented one or more network control policies.

In some embodiments, the network infrastructure comprises multiple devices and operating systems including servers, mobile device, and smart devices.

In other embodiments, the one or more network control policies further comprise a user permissions level.

In further embodiments, circumventing the one or more network control policies further comprises elevating the user permissions level without proper authority.

In still further embodiments, the one or more network control policies further comprise access to a user account.

In some embodiments, circumventing the one or more network control policies further comprises accessing the user account without proper authentication.

In other embodiments, the one or more autonomous programs further comprise a network of chat bots configured to communicate with one or more human users and emulate one or more data misappropriation methods.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
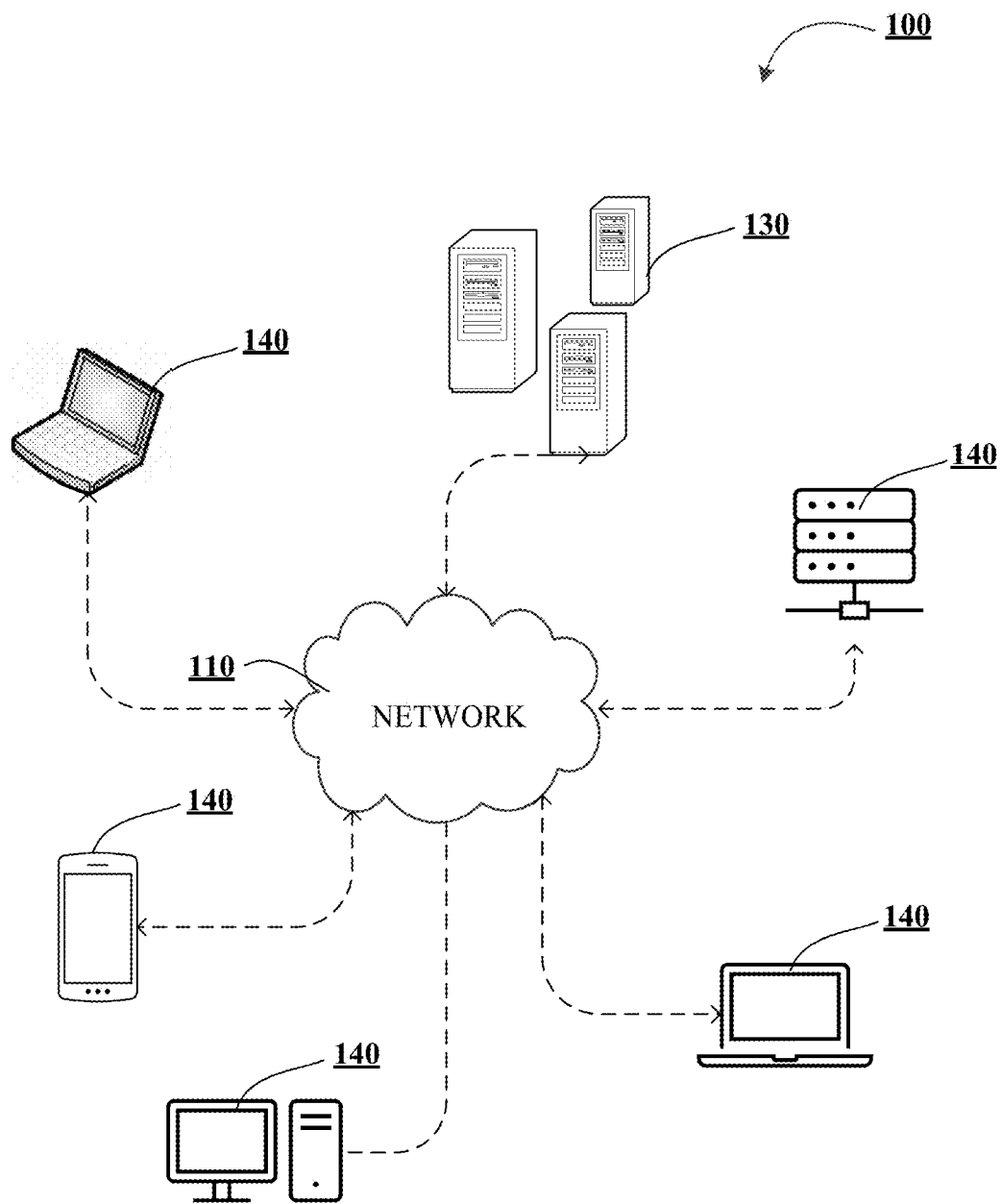
Figure 1B:
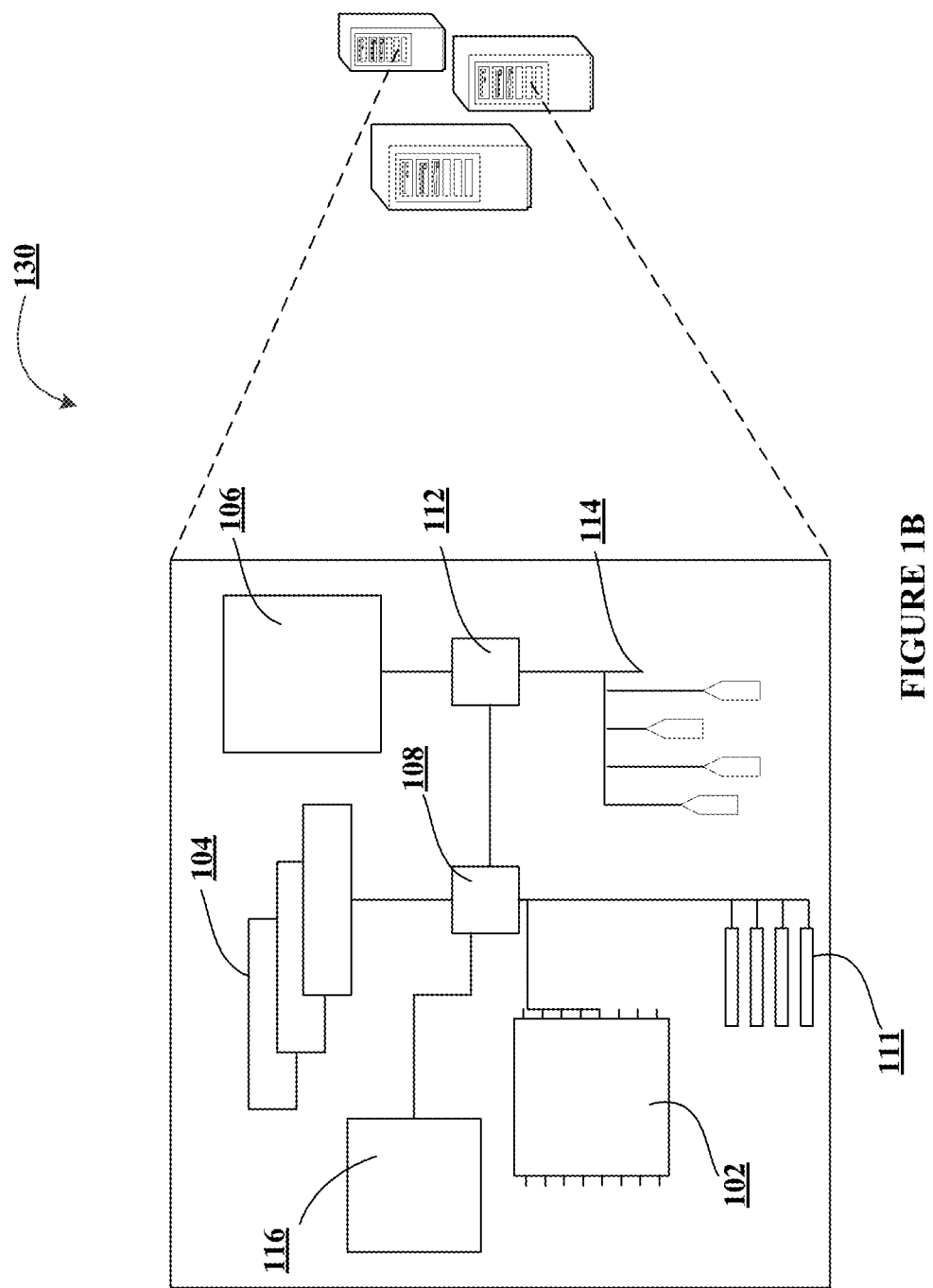
Figure 1C:
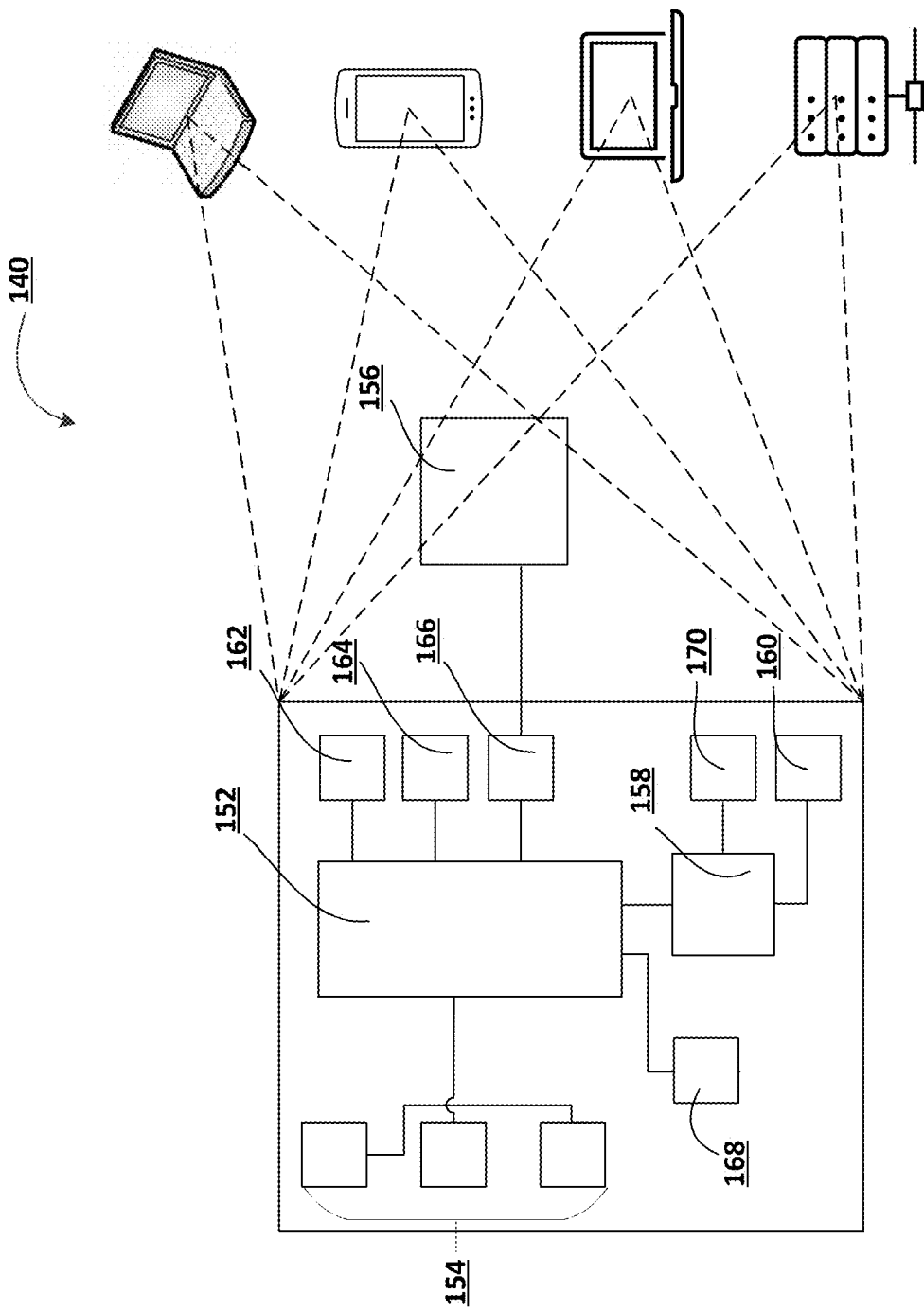
Figure 2:
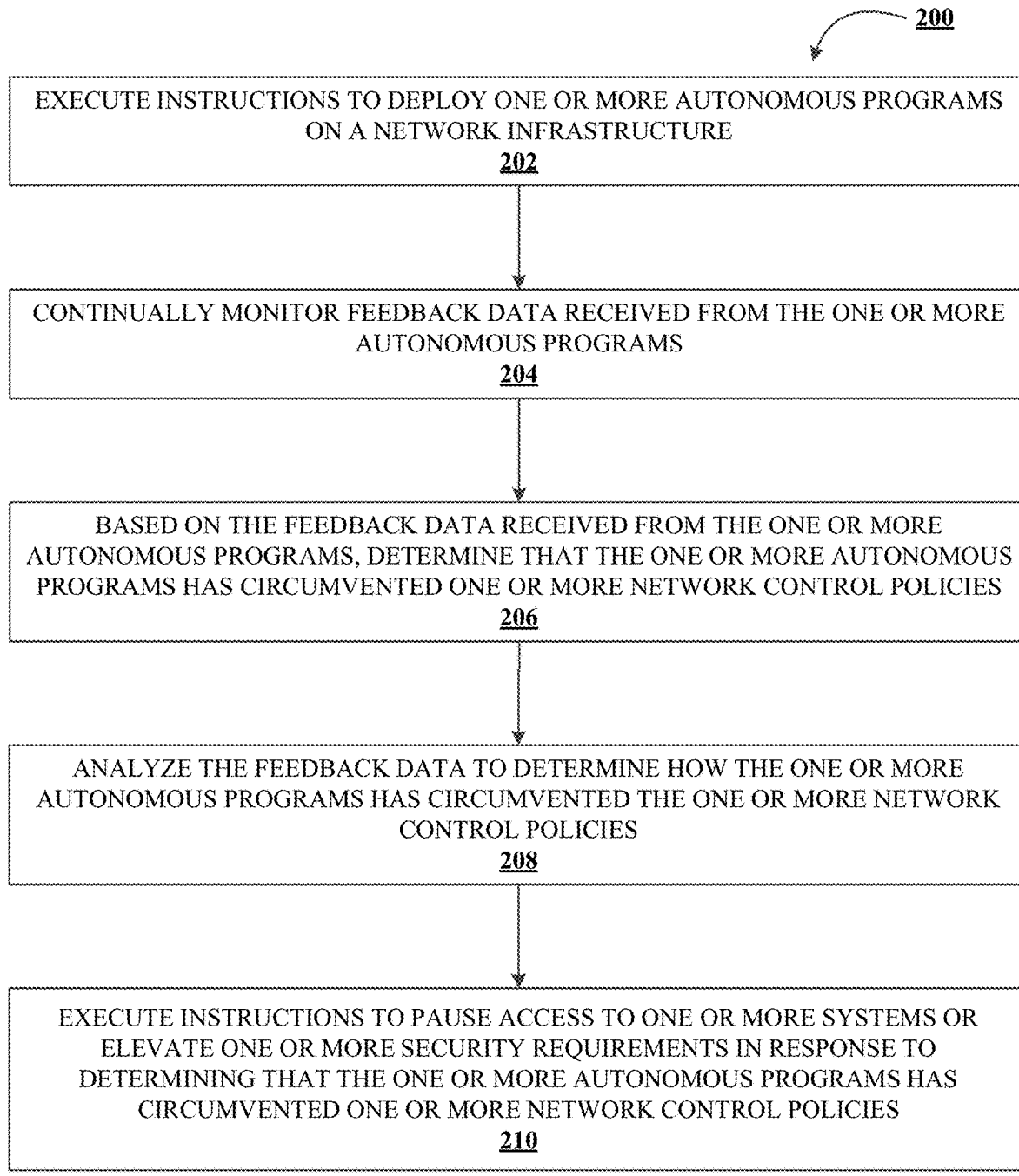

FIGS. 1A-1C illustrates technical components of an exemplary distributed computing environment for deploying automated diagnostic engines for identification of network controls status, in accordance with an embodiment of the disclosure;

FIG. 2 illustrates a process flow for deploying automated diagnostic engines for identification of network controls status, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Systems, methods, and computer program products are provided for deploying automated diagnostic engines for identification of network controls status. A manager of an electronic network may wish to determine whether their controls (e.g., controls used for authenticating access credentials, controls to determine whether privileges should be elevated, and/or the like) are acting properly or which controls contain gaps. The invention provides a system that trains and implements a network of bots to test and determine whether electronic controls are in place and working according to their intended design. For instance, the network of bots may be trained based on different testing scenarios (e.g., a specific team may train their own network of bots to test whether a user is attempting to improperly elevate their privileges, to test other controls, to test controls across different platforms, and/or the like) and may generate telemetry data showing which controls are working properly and which controls are not. In some embodiments, the bots may further be trained to give a diagnosis of where the controls are failing, why the controls are failing, and what should be implemented to improve or fix the controls.

In some embodiments, the network of bots may comprise a network of chat bots which are used in combination with a middleware component (e.g., a component between third party sources in which data is collected, or the like) to further enrich the data used to train the chat bots so the chat bots are aware how to run the tests to copy a misappropriation attempt. Based on the whether the chat bots are able to get through the controls using the enriched tests, the system may determine how to enhance the controls to prevent future attacks.

FIGS. 1A-1C illustrate technical components of an exemplary distributed computing environment for deploying automated diagnostic engines for identification of network controls status 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for deploying automated diagnostic engines for identification of network controls status, in accordance with an embodiment of the disclosure. As shown in block 202, the system first executes instructions to deploy one or more autonomous programs on a network infrastructure, such as network 110. It is understood that multiple types of devices, and multiple different operating systems, may interact over network 110. One of ordinary skill in the art will appreciate that the system of the invention is designed to interact in a platform or channel agnostic fashion, wherein the one or more autonomous programs, or "bots," are programmed to interact with devices ranging from mobile devices, personal computing devices, servers, smart devices, or the like. In some embodiments, the bots are programmed to emulate human user behavior, such as the methods or communications utilized when accessing systems, platforms, portals, or accounts that require user authentication or elevated user privileges. For instance, it is understood that a human user may be a customer of a financial entity in some embodiments, and may wish to access a user resource account managed or custodied by the entity which manages and operates the system herein. In other embodiments, a human user may be an employee of the entity of the system described herein. In still further embodiments, a human user may be a third party individual, vendor, partner, consultant, or the like, which is granted certain limited privileges to access certain data on the entity system described herein. In any of these embodiments, it is understood that the human users each have specific permissions or abilities with respect to the data and devices that they may access, control, or alter on the network 110. It is understood that the autonomous programs are programmed to emulate users from each of these standpoints and routinely attempt to access devices, data, or the like, for which they may not be privileged to access. As such, the autonomous programs provide a means for testing network security robustness in an automated and intelligent fashion over a continuous time period. Data obtained from the one or more autonomous programs may be used to further analyze gaps in network security permissions protection and proactively make changes in order to prevent unauthorized access to systems, devices, permissions, or data by one or more human users.

As shown in block 204 the system continually monitors feedback data received from the one or more autonomous programs. For instance, the one or more autonomous programs may, in some embodiments, be tasked with attempting to improperly elevate user privileges, to test controls, to test controls across different platforms, and/or the like, and may generate telemetry data showing which controls are working properly and which controls are not. In some embodiments, the one or more autonomous programs may further be trained to give a diagnosis of where the controls are failing, why the controls are failing, and what should be implemented to improve or fix the controls.

Based on the feedback data received from the one or more autonomous programs, the system may determine that the one or more autonomous programs has circumvented one or more network control policies, as shown in block 206. For instance, in some embodiments, the feedback data received from the one or more autonomous programs may indicate the one or more autonomous programs successfully is able to elevate user privileges in a scenario where a system administrator has not granted permission to do so. The system may analyze the feedback data received from the one or more autonomous programs to determine how the one or more autonomous programs has circumvented the one or more network control policies, as shown in block 208. In some embodiments, the one or more autonomous programs may comprise a network of chat bots which are used in combination with a middleware component (e.g., a component between third party sources in which data is collected, or the like) to further enrich the data used to train the chat bots so the chat bots are aware how to run the tests to copy a misappropriation attempt. Based on the whether the chat bots are able to get through the controls using the enriched tests, the system may determine how to enhance the controls to prevent future attacks. As shown in block 210, the system may then execute instructions to address the identified gap in network security control. For instance, the system may pause access to one or more systems, devices, data stores, or the like. In other embodiments, the system may elevate security requirements in response to determining that the one or more autonomous programs has circumvented one or more network control policies. For instance, the system may implement a network-wide re-authentication requirement wherein users must provide a 2-facotor authentication in order to reinstate their user privileges. In other embodiments, the system may prompt users on a network to change their passwords, issue temporary passwords, automatically log one or more users out of the system, pause one or more resource transactions, or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for identifying network control gaps, the system comprising:
at least one non-transitory storage device; and
at least one processor coupled to the at least one non-transitory storage device, wherein the at least one processor is configured to:
execute instructions to deploy one or more autonomous programs on a network infrastructure, wherein the one or more autonomous programs further comprise a network of chat bots configured to communicate with one or more human users and emulate one or more data misappropriation methods including requesting access to devices and data for which the one or more autonomous programs are not authorized to access;
continually monitor feedback data received from the one or more autonomous programs;
based on the feedback data received from the one or more autonomous programs, determine that the one or more autonomous programs has circumvented one or more network control policies;
analyze the feedback data to determine how the one or more autonomous programs has circumvented the one or more network control policies; and
execute instructions to pause access to one or more systems or elevate one or more security requirements in response to determining that the one or more autonomous programs has circumvented one or more network control policies.

2. The system of claim 1, wherein the network infrastructure comprises multiple devices and operating systems including servers, mobile device, and smart devices.

3. The system of claim 1, wherein the one or more network control policies further comprise a user permissions level.

4. The system of claim 3, wherein circumventing the one or more network control policies further comprises elevating the user permissions level without proper authority.

5. The system of claim 1, wherein the one or more network control policies further comprise access to a user account.

6. The system of claim 5, wherein circumventing the one or more network control policies further comprises accessing the user account without proper authentication.

7. A computer program product for automatically identifying network control gaps, the computer program product comprising a non-transitory computer-readable medium comprising code causing an apparatus to:
  execute instructions to deploy one or more autonomous programs on a network infrastructure, wherein the one or more autonomous programs further comprise a network of chat bots configured to communicate with one or more human users and emulate one or more data misappropriation methods including requesting access to devices and data for which the one or more autonomous programs are not authorized to access;
  continually monitor feedback data received from the one or more autonomous programs;
  based on the feedback data received from the one or more autonomous programs, determine that the one or more autonomous programs has circumvented one or more network control policies;
  analyze the feedback data to determine how the one or more autonomous programs has circumvented the one or more network control policies; and
  execute instructions to pause access to one or more systems or elevate one or more security requirements in response to determining that the one or more autonomous programs has circumvented one or more network control policies.

8. The computer program product of claim 7, wherein the network infrastructure comprises multiple devices and operating systems including servers, mobile device, and smart devices.

9. The computer program product of claim 7, wherein the one or more network control policies further comprise a user permissions level.

10. The computer program product of claim 9, wherein circumventing the one or more network control policies further comprises elevating the user permissions level without proper authority.

11. The computer program product of claim 7, wherein the one or more network control policies further comprise access to a user account.

12. The computer program product of claim 11, wherein circumventing the one or more network control policies further comprises accessing the user account without proper authentication.

13. A method for automatically identifying network control gaps, the method comprising:
  deploying one or more autonomous programs on a network infrastructure, wherein the one or more autonomous programs further comprise a network of chat bots configured to communicate with one or more human users and emulate one or more data misappropriation methods including requesting access to devices and data for which the one or more autonomous programs are not authorized to access;
  continually monitoring feedback data received from the one or more autonomous programs;
  based on the feedback data received from the one or more autonomous programs, determining that the one or more autonomous programs has circumvented one or more network control policies;
  analyzing the feedback data to determine how the one or more autonomous programs has circumvented the one or more network control policies; and
  executing instructions to pause access to one or more systems or elevate one or more security requirements in response to determining that the one or more autonomous programs has circumvented one or more network control policies.

14. The method of claim 13, wherein the one or more network control policies further comprise a user permissions level.

15. The method of claim 14, wherein circumventing the one or more network control policies further comprises elevating the user permissions level without proper authority.

16. The method of claim 13, wherein the one or more network control policies further comprise access to a user account.

17. The method of claim 16, wherein circumventing the one or more network control policies further comprises accessing the user account without proper authentication.

\* \* \* \* \*